(12) United States Patent
Sallee et al.

(10) Patent No.: US 11,170,264 B2
(45) Date of Patent: Nov. 9, 2021

(54) LABELING USING INTERACTIVE ASSISTED SEGMENTATION

(71) Applicant: Raytheon Company, Waltham, MA (US)

(72) Inventors: Philip A. Sallee, South Riding, VA (US); Stephen J. Raif, Sachse, TX (US); James Talamonti, McLean, VA (US)

(73) Assignee: Raytheon Company, Waltham, MA (US)

( * ) Notice: Subject to any disclaimer, the term of this patent is extended or adjusted under 35 U.S.C. 154(b) by 186 days.

(21) Appl. No.: 16/428,198

(22) Filed: May 31, 2019

(65) Prior Publication Data

US 2020/0380304 A1    Dec. 3, 2020

(51) Int. Cl.
*G06K 9/00*    (2006.01)
*G06K 9/62*    (2006.01)
(Continued)

(52) U.S. Cl.
CPC ....... *G06K 9/6259* (2013.01); *G06K 9/00671* (2013.01); *G06K 9/6277* (2013.01);
(Continued)

(58) Field of Classification Search
CPC .. G06K 9/6253; G06K 9/6254; G06K 9/6263; G06K 9/6259; G06K 9/00671; G06K 9/6277; G06T 7/10–194; G06T 2207/20081; G06T 2207/20084; G06T 7/187; G06T 7/136; G06N 3/02–088; G06N 20/00; G06N 20/10; G06N 20/20
(Continued)

(56) References Cited

U.S. PATENT DOCUMENTS 9,367,743 B1    6/2016    Haglund et al.
9,704,041 B2    7/2017    Haglund et al.
(Continued)

FOREIGN PATENT DOCUMENTS

CN    109785361    5/2019
IN    202044013227 A    12/2020

OTHER PUBLICATIONS

Kasarla, Tejaswi, et al. "Region-based active learning for efficient labeling in semantic segmentation." 2019 IEEE Winter Conference on Applications of Computer Vision (WACV). IEEE, 2019. (Year: 2019).*

Caesar, Holger, Jasper Uijlings, and Vittorio Ferrari. "COCO-Stuff: Thing and Stuff Classes in Context." 2018 IEEE/CVF Conference on Computer Vision and Pattern Recognition. IEEE, 2018. (Year: 2018).*

(Continued)

*Primary Examiner* — Shefali D Goradia
(74) *Attorney, Agent, or Firm* — Schwegman Lundberg & Woessner, P.A.

(57) ABSTRACT

Subject matter regards improving image segmentation or image annotation. A method can include receiving, through a user interface (UI), for each class label of class labels to be identified by the ML model and for a proper subset of pixels of the image data, data indicating respective pixels associated with the class label, partially training the ML model based on the received data, generating, using the partially trained ML model, pseudo-labels for each pixel of the image data for which a class label has not been received, and receiving, through the UT, a further class label that corrects a pseudo-label of the generated pseudo-labels.

20 Claims, 10 Drawing Sheets

(51) Int. Cl.
*G06T 7/187* (2017.01)
*G06T 7/136* (2017.01)
*G06N 20/00* (2019.01)

(52) U.S. Cl.
CPC ............. *G06N 20/00* (2019.01); *G06T 7/136* (2017.01); *G06T 7/187* (2017.01); *G06T 2207/20081* (2013.01)

(58) Field of Classification Search
USPC ................................. 382/156–158, 173, 180
See application file for complete search history.

(56) References Cited

U.S. PATENT DOCUMENTS

| | | | |
|---|---|---|---|
| 2004/0202368 A1* | 10/2004 | Lee ......................... | G06T 7/143 382/173 |
| 2018/0300576 A1* | 10/2018 | Dalyac ................. | G06K 9/6218 |
| 2019/0057274 A1 | 2/2019 | Inaba | |
| 2019/0073447 A1* | 3/2019 | Guo ....................... | G16H 50/20 |
| 2019/0332893 A1* | 10/2019 | Roy Chowdhury ...... | G06T 7/12 |
| 2019/0347524 A1* | 11/2019 | Znamenskiy ........ | G06K 9/6253 |
| 2020/0151459 A1* | 5/2020 | Farre Guiu .......... | G06K 9/6263 |
| 2020/0193604 A1* | 6/2020 | Myronenko ......... | G06K 9/6262 |

OTHER PUBLICATIONS

Benenson, Rodrigo, Stefan Popov, and Vittorio Ferrari. "Large-scale interactive object segmentation with human annotators." arXiv preprint arXiv: 1903.10830 (2019). (Year: 2019).*

Olabarriaga, Sílvia Delgado, and Arnold WM Smeulders. "Interaction in the segmentation of medical images: A survey." Medical image analysis 5.2 (2001): 127-142. (Year: 2001).*

Wigness, Maggie. Superlabel: A superpixel labeling interface for semantic image annotation. Army Research Lab Adelphi MD United States, 2018. (Year: 2018).*

Christensson, Per. "Buffer Definition." TechTerms. Sharpened Productions, 2006. Web. Mar. 18, 2016. <https://techterms.com/definition/buffer>. (Year: 2006).*

"Australian Application Serial No. 2020201897, First Examination Report dated Aug. 28, 2020", 7 pgs.

Agustsson, Eirikur, et al., "Interactive Full Image Segmentation by Considering All Regions Jointly", Retrieved from Internet. URL: <https://arxiv.org/abs/1812.01888>, (Apr. 10, 2019), 10 pgs.

Andriluka, Mykhaylo, et al., "Fluid Annotation: A Human-Machine Collaboration Interface for Full Image Annotation", Retrieved from Internet. URL: <https://arxiv.org/pdf/1806.07527>, (Dec. 20, 2018), 10 pgs.

* cited by examiner

LABELING USING INTERACTIVE ASSISTED SEGMENTATION

TECHNICAL FIELD

Some embodiments described herein generally relate to labeling of machine learning (ML) model data.

BACKGROUND

Advancements in machine classification have demonstrated dramatic improvement through the use of neural networks (NNs) trained in a supervised fashion. To meet ever-increasing demands of classification performance and problem complexity, network depths continue to increase. This places a heavy demand on the size of the training sets required to avoid over-fitting additional free parameters, or weights, of the network. In many cases, hundreds of thousands or even millions of training examples must be assigned class labels to properly train the NN. This class labelling is often done by crowd-sourcing. The volume of data makes enforcing labeling consistency and filtering out incorrect labels both challenging and costly. Training with such 'noisy labels' can drastically degrade classification performance, making efforts of quality control a cost factor to be balanced with the desired performance. In other cases, automation or data mining provide a means to obtain labels, however, the labels are only approximate.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
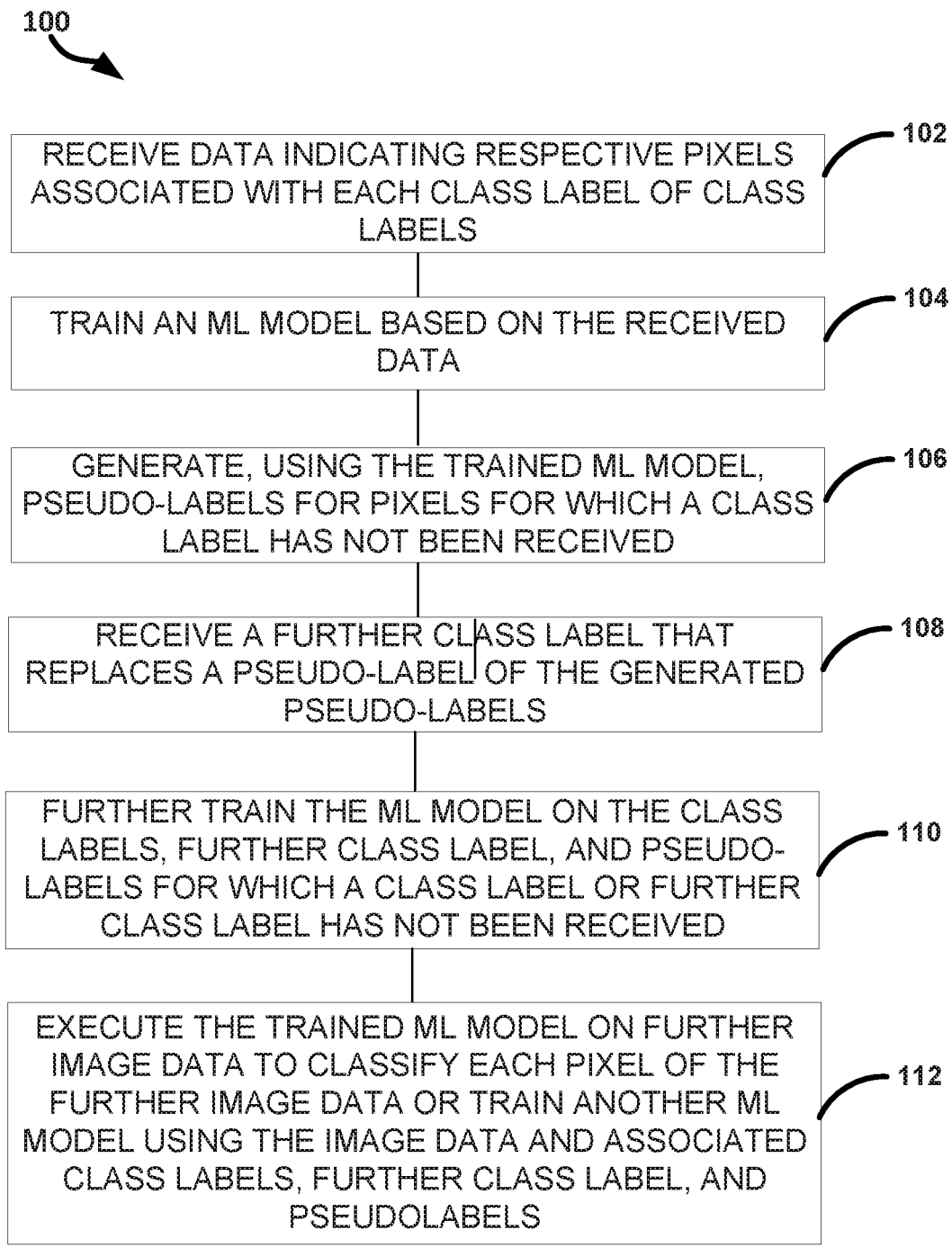
FIG. 1 illustrates, by way of example, a diagram of an embodiment of a method for image segmentation.

Aspects of embodiments are directed to supervised or semi-supervised machine learning. Supervised methods for machine learning with neural networks generally use large labeled datasets for training and evaluation. Generating these large datasets is difficult, time consuming, and cost prohibitive. Manual adjudication to correct labeling errors is typically too costly or time consuming. Embodiments enable fast, human-interactive, labelling of data and can accelerate the time it takes to label a large amount of data, thus reducing the cost to label.

A particularly difficult category of labelling is image segmentation. In image segmentation, each pixel is labelled as being a member of a particular class. To train a machine learning (ML) model that performs image segmentation, many instances of each class are usually manually labelled (e.g., via crowd sourcing). This manual labelling is prohibitively expensive, time consuming, and error prone. For example, to produce a complete segmentation of a single image may require many hours of manual labor. The amount of time for the segmentation depends on the number of objects in the image, the number of classes of objects to be labelled, and the size of the image (e.g., where size is in terms of the number of pixels, geographical area covered in the image, a combination thereof, or the like).

Companies that label data for ML purposes (sometimes called annotation firms) can employ crowd-sourcing methods to annotate data. Annotating data is indicating a class label to be associated with the data. In some cases, an annotator employs an ML technique that has been trained using a subset of annotated data to generate labels for other data. That data can then be manually corrected.

Some methods of interactive object and full image segmentation have been proposed by others. One of these methods uses a mask regions with convolutional NN features (Mask-RCNN) architecture. The architecture requires a user to initially provide box regions for every single object using extreme points. RCNN's are also relatively slow, as they require proposal networks to identify potential object regions for each object. Therefore, their approach is only suitable for images composed of small numbers of objects and does not apply well to large overhead imagery in which there are many, potentially very small, object boundaries to refine. To knowledge, the proposed method of embodiments is unique in its ability to label every pixel using a combination of unsupervised, semi-supervised, and human assisted segmentation.

Embodiments can use interactive ML to assist a human annotator. Embodiments can use a combination of unsupervised and semi-supervised techniques. In some embodiments, a human annotator interacts with a device to label a subset of pixels of an image (e.g., overhead imagery). An ML model can be updated and used to predict labels for pixels that have not be labeled by the human annotator. The predicted labels are called pseudo-labels, while the labels provided by the human annotator are called actual labels. Embodiments can leverage the pseudo-labels (a semi-supervised ML training technique). The actual labels or pseudo-labels can be corrected by the annotator. The ML model can then be retrained using the corrected labels as actual labels. This interactive process allows the annotator to label only the regions that the ML model is getting incorrect. This significantly reduces the amount of time required to label larger images. Large, in this context, means greater than 10 Megapixels. In some cases, the amount of time it takes using embodiments of this disclosure is 24 to 48 times less than performing the annotation by other means. Using embodiments of this disclosure, it can take 10 to 20 minutes to perform annotation of an image for which it takes an annotator 8 to 10 hours to perform annotation by other means.

After training on at least a portion of an image, the ML model can operate on other images or other portions of an image to classify objects. Embodiments can be advantageous for large images, such as geospatial imagery, or can be adapted to apply across many frames of a video or multiple images. In embodiments, an autoencoder can be trained on unlabeled pixel data and used to preprocess the images into a more suitable feature space for the ML model to run on. Use of the autoencoder can reduce an amount of labeled data needed to train the ML model. In some embodiments, the received labels and the generated pseudo-labels are of importance to a user, such as for further training a same or different ML model, analytics, or the like. To this end, the labels and pseudo-labels and corresponding pixel values can be stored to a memory for later use. In some embodiments, the trained model is the item of importance, such as for image segmentation on further images. To this end, the model parameters (weights) can be stored to a memory for later use.

An improvement in annotating provided by embodiments is transparent to the human annotator who is presented the original image to annotate and views the image as embodiments are executed. This is because (A) the human annotator will generally label a small portion of an image, (B) the ML model will generate pseudo-labels for unlabeled pixels based on that annotation, (C) the human annotator will correct one or more errors in the pseudo-labels, and (D) the model will be further trained based on the updated annotations and produce pseudo-labels based on the updated annotated labels and prior, unchanged pseudo-labels. The operations (C) and (D) can be repeated until the human annotator is satisfied with the annotation of the image. In embodiments, the annotator can specify (e.g., by a slider or other software control) a threshold that is applied to the predicted probability confidence of the network to determine which pseudo-labels to display based on network confidence. For example, if a particular pixel has an associated class vector with all entries below a specified threshold, embodiments can display the pixel as unclassified. A modified fully-convolutional U-NET architecture is an example of a network segmentation model. A description of U-NET can be found in the publication "U-Net: Convolutional Networks for Biomedical Image Segmentation" by Olaf Ronneberger, Philipp Fischer, and Thomas Brox.

An advantage of embodiments can be provided by one or more of (a) use of pseudo-labels to provide pixel-based clustering and in conjunction with semi-supervised learning for large-scale image segmentation, (b) use of an interactive annotation and re-training process to refine pseudo-label predictions and perform rapid image segmentation focused on what the machine is getting incorrect, (c) use of autoencoder to pre-transform images into a feature space more suitable for machine segmentation, (d) use of a convolutional network architecture for interactive human and machine image segmentation, or (e) a threshold selection mechanism by which the human annotator can limit the displayed automated labels based on the predicted model probability (sometimes called confidence score) for each pseudo-label, among others.

This disclosure proceeds by describing a process of embodiments, providing a visual description of the operation of embodiments, and then describing a system operable to implement the process. Reference will now be made to the FIGS. to describe further details of embodiments.

FIG. 1 illustrates, by way of example, a diagram of an embodiment of a method 100 for image segmentation. The method 100 as illustrated includes receiving data indicating respective pixels associated with each class label of class labels, at operation 102; training an ML model based on the received data, at operation 104; generating pseudo-labels for each pixel of the image data for which a class has not been received, at operation 106; receiving a further class label that replaces a pseudo-label of the generated pseudo-labels, at operation 108; further training the ML model using the class labels, further class label, and pseudo-labels for which a class label or further class label has not been received, at operation 110; and (a) executing the trained ML model on further image data to classify each pixel of the further image data or (b) training another ML model using the image data and the associated class labels, further class label, and pseudo-labels, at operation 112.

Image data can include, for example, pixel values of a color image, grayscale image, infrared image, thermal image, synthetic aperture radar (SAR) image, radar image, synthetic aperture sonar (SAS) image, a three-dimensional (3D) point cloud, topological map, audio data represented using spectrograms, or other scientific measurements or other data represented in the form of an image.

The data indicating respective pixels associated with each class label can be received through a user interface. The data indicating respective pixels associated with each class label can be for each pixel of a proper subset of pixels of the image data. The data indicating respective pixels associated with each class label can be received for each class label to be identified by the ML model.

The further class label can be received through the UI. The UI can provide the user with a view of the image that indicates a class label or pseudo-label for each pixel of the image data. The user can identify, based on the provided view, a pseudo-label that is incorrect. The user can change, using the UI, the pseudo-label to the further class label, such as to correct the pseudo-label.

Further training the ML model can be performed using pixels that have received class labels, pixels that have a further class label, and, for pixels that do not have class labels or a further class label, the pseudo-label. The data indicating respective pixels associated with each class label of class labels can be provided by a user, using the UI, selecting a class label of the class labels on the UI. After selecting the class label, the user, using the UI, can select pixels of the rendered image to be associated with the selected class label. Selecting can include pressing and releasing a mouse button while a pointer is over the class label, audio input indicating the class label, touching, on a touch screen, the class label, or the like.

The method 100 can further include, before training the ML model based on the received data, processing the image data into a segmentation feature space. This processing can include a mathematical transform of the image data, such as by using a Fast Fourier Transform (FFT), spectral whitening, decorrelation or other mathematical transform. The segmentation feature space can also be learned from the image data, transformed image data, or from other image data, using an autoencoder. An autoencoder is comprised of encoder and decoder NNs that transform input space to a feature space and back to the input space. An autoencoder may be compressive, if the number of dimensions in the feature space is fewer than the number of input dimensions. Variational autoencoders (VAE), or denoising autoencoders are examples of autoencoders. A modified fully-convolutional U-NET architecture is an example of a network segmentation model that may be trained using an autoencoder. Once trained, the encoder network of an autoencoder may be used to transform the received data into the learned feature space of the autoencoder. The transformed data may then be used as input to the ML model at operation 104.

The method 100 can further include, before performing operation 104, associating a class label with each pixel of the image data for which a class label was not received. The method 100 can further includes associating a pixel with a different pseudo-label or class label only in response to determining a generated pseudo-label for the pixel has an associated confidence score greater than a specified threshold. The threshold can be specified by a user through the UI.

A pseudo-label is a class label that is associated with a pixel by a partially trained model. The pseudo-label is the class associated with the highest confidence as determined by the partially trained ML model in a previous epoch of training.

Figure 2:
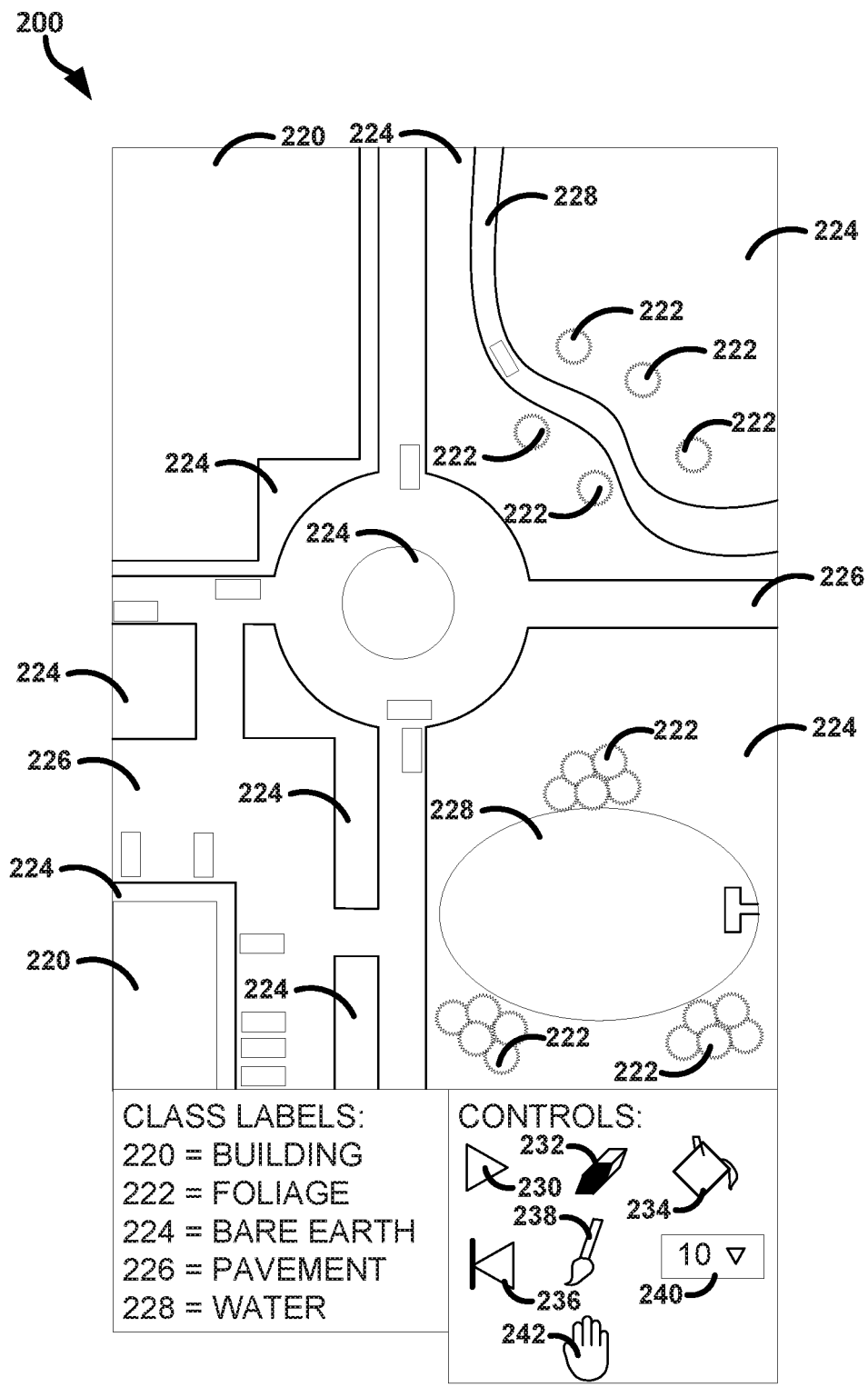
FIG. 2 illustrates, by way of example, a diagram of an embodiment of a UI to aid in image segmentation.

FIG. 2 illustrates, by way of example, a diagram of an embodiment of a UI 200 to aid in image segmentation. The UI 200 includes a rendered image above software controls 230, 232, 234, 236, 238, 240, and 242. The orientation of the rendered image to the controls is not important and can vary. The number of software controls can vary, such as to include more or fewer software controls than what is illustrated in FIG. 2. The image rendered on the UI 200 includes desired annotations. The class labels of the rendered image include buildings 220, foliage 222, bare earth 224, pavement 226, and water 228. The class labels illustrated in FIG. 2 indicate the target labelling of the rendered image. This is not how the image annotation begins, but it provides a convenient reference to discuss how the annotation process proceeds.

Each class label can correspond to a different color, shading, or other distinguishing representation. The UI 200 can provide a view of the rendered image with pixels colored according to their representation.

A user can select a software control 230, 232, 234, 236, 238, 240, and 242 to perform operations on the rendered image. The device that is presenting the UI 200 can then interpret the user interaction with the rendered image, alter data for training an ML model for image segmentation, or cause the ML model to be altered.

In response to selecting a play software control 230, processing circuitry of the device can perform an iteration of training on the ML model. A result of the training iteration can include generating pseudo-labels for pixels of the rendered image that have not been assigned a class label to this point. Another result of the training iteration can include an improved ML model. The improvement can be from training based on more complete (more accurate) training data.

A user can select an erase software control 232 and then select one or more pixels of the rendered image to erase a class label previously assigned by the user. The device providing the UI 200 can then erase that class label from the corresponding training data in a memory.

A user can select a fill software control 234 and then the user can then select a class label, or vice versa. The user can then select a pixel of the rendered image. In response, the UI 200 can change a view of the selected pixel and all other pixels contiguous with the selected pixel that are associated with the same class to the selected class label. The device providing the UI 200 can cause all of the contiguous pixels to be associated with the class label corresponding to the selected class label in a memory.

A user can select a revert to the beginning software control 236 to undo all of the manual or training annotations that have been made to the rendered image. In response, the UI 200 can provide a view of the image without any representation of the class label (sometimes called providing a view of raw image data). The device providing the UI 200 can cause all of the class label associations to be removed from memory.

A user can select a paintbrush software control 238 and then the user can then select a class label, or vice versa. The user can then select one or more pixels of the rendered image. Note that selection can include pressing a button or touching and dragging, such as without releasing the button or removing the finger from the screen. In such cases, all pixels over which the cursor or pointer passed in the drag can be selected. In response, the UI 200 can change a view of the selected pixels to the representation corresponding to the selected class label. The device providing the UI 200 can cause all of the selected pixels to be associated with the class label corresponding to the selected class label in a memory.

The size software control 240, when selected, can be used to change a size of the eraser software control 232 or the paintbrush software control 236. This alters the number of pixels that are affected when the user selects and uses the software control 232, 236. The user can select the size software control 240 and a corresponding size from a drop-down menu or enter a custom size into the size software control 240 text box.

The hand software control 242 provides the user an ability to alter the portion of the image rendered on the UI 200. The user can select the hand software control 242 and then select and drag the rendered image to alter the portion of the image rendered.

Figure 3:
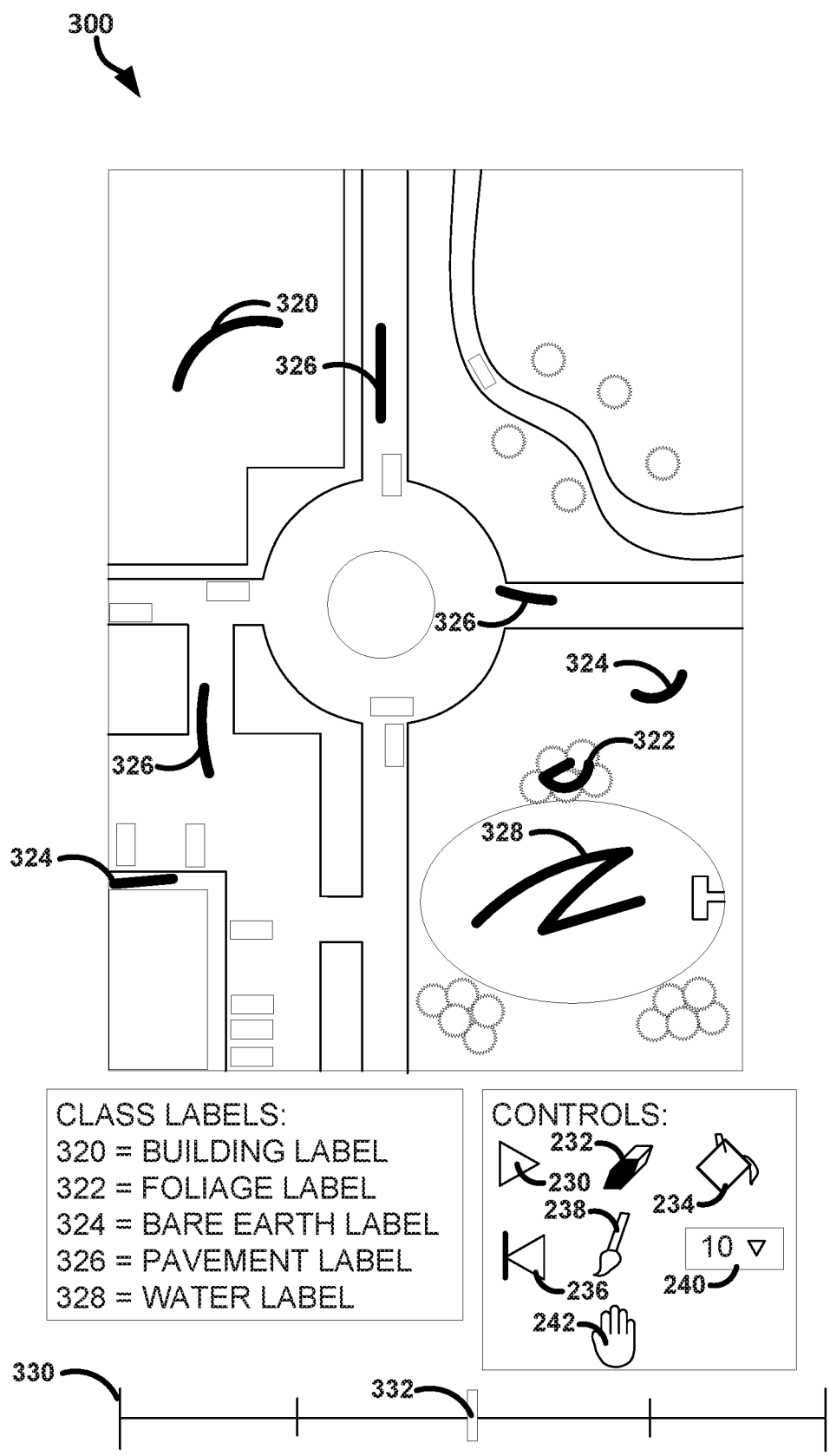
FIG. 3 illustrates, by way of example, a diagram of an embodiment of a UI after some preliminary annotations.

FIGS. 3-8 illustrate aspects of using a UI to perform interactive human and machine image segmentation. FIG. 3 illustrates, by way of example, a diagram of an embodiment of a UI 300 after some preliminary annotations. The UI 300 includes the rendered image with annotated pixels (corresponding to dark lines with reference numerals). The annotated pixels can be provided by the user selecting the paintbrush software control 238, a class label 320, 322, 324, 326, 328, and selecting a pixel of the rendered image. Embodiments can operate with more accuracy or converge more quickly to a fully segmented image when the user annotates at least one instance of each class label.

In practice, each of the class labels 320, 322, 324, 326, 328 can correspond to different colors, shades, hashing, dashes, or other representations. Thus, each of the lines corresponding to the class labels 320, 322, 324, 326, 328 can be visually represented differently on the UI 300. This representation allows the user to quickly identify what has been annotated (provided with a class label) and the class label assigned to a pixel.

The UI 300 includes a slider bar 330 that allows the user to set a label opacity. The label opacity controls how well the user to see behind or through the label to a view of the image. By sliding the location of an indicator 332 on the slider bar 330, the user can adjust how easy it is to see behind the representation of the label to the view of the raw image.

The user, after annotation, can select the play software control 230. As previously discussed, this causes processing circuitry to perform an iteration of ML model training. In performing the iteration of ML model training, the ML model can generate pseudo-labels for each of the pixels that has been associated with a class label by the user. A result of at least one training iteration is provided in FIG. 4.

Figure 4:
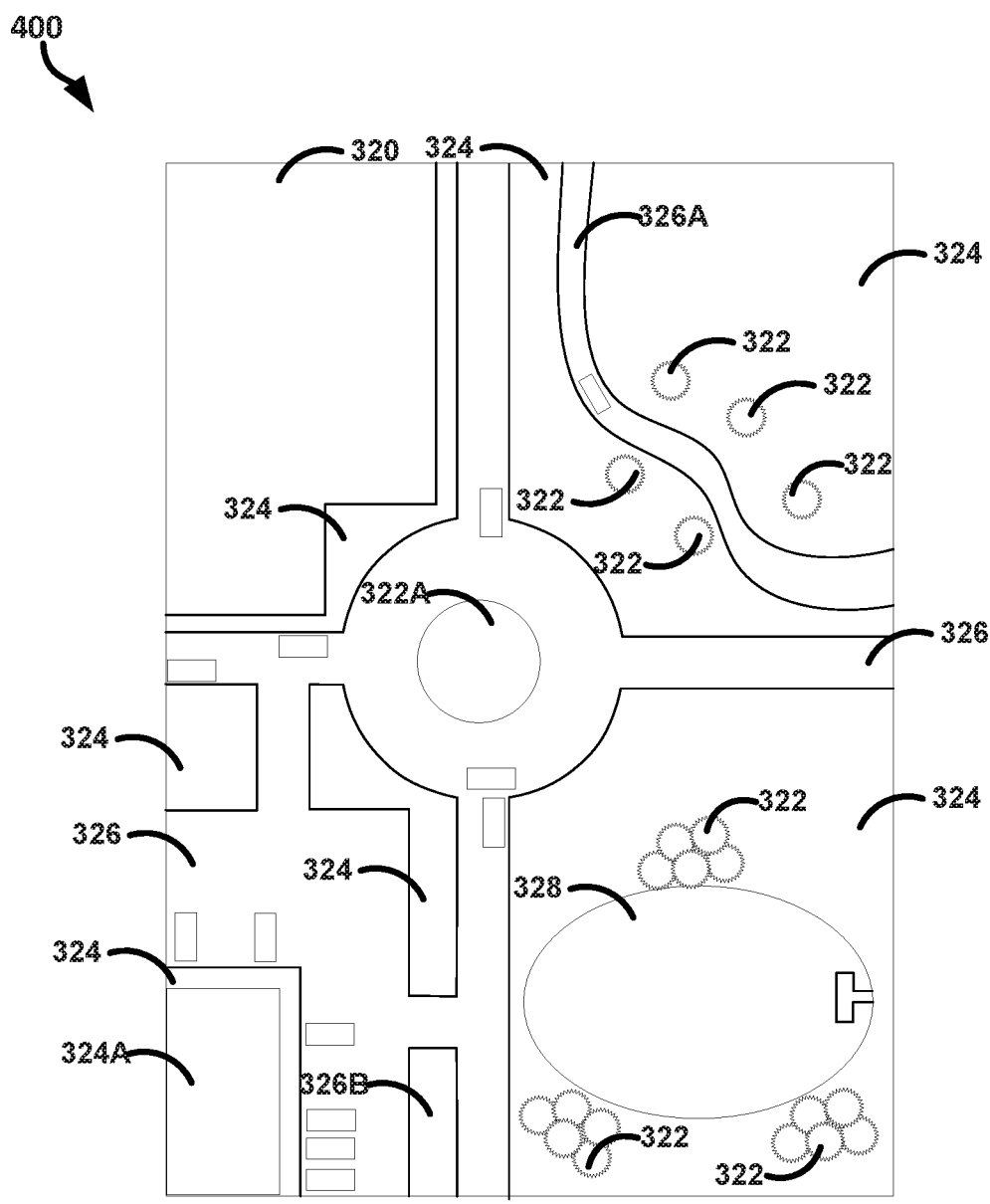
FIG. 4 illustrates, by way of example, a diagram of an embodiment of a UI that provides a view of image segmentation after at least one iteration of training.
Figure 4:
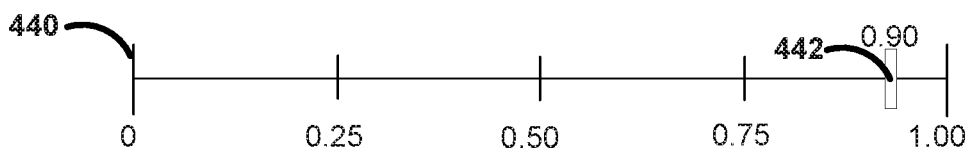

FIG. 4 illustrates, by way of example, a diagram of an embodiment of a UI 400 that provides a view of image segmentation after at least one iteration of training. Reference numerals that include suffixes correspond to objects that are mislabeled. The UI 400 includes class labels predicted by the ML model. The class labels include pseudo-labels generated by the ML model and class labels provided by the user. Pseudo-labels are provided, by the ML model, for pixels for which class labels have not been specified by the user.

The pseudo-label generated by the ML model can include a class label corresponding to a largest valued entry (confidence score or probability) in a class vector generated for that pixel. In some embodiments, the pseudo-label entry can be used as the class label only if the largest valued entry in the class vector is greater than a specified threshold. The threshold can be specified by the user, such as through the UI 400.

The UI 400 includes a slider bar 440 that allows the user to set the threshold. By sliding the location of an indicator 442 on the slider bar 440, the user can adjust how much confidence is required to change a class label (of a pixel not assigned a class label by the user) to a class indicated by the pseudo-label.

ML models are typically very accurate at identifying boundaries of an object, while humans can very efficiently identify pixels inside of an object boundary. A human typically has a much harder time at identifying edge pixels than an ML model. The human and machine interactive approach to image segmentation of embodiments can thus exploit the strengths of both the human user and the ML model.

The errors made by the ML model in annotating the image include confusing a building for bare earth by class label 324A, bare earth for pavement by class label 326B, bare earth for foliage by class label 322A, and water for pavement at class label 326A. The user can influence correction of the errors made by the ML model using the fill software control 234, the paint software control 238, or the erase software control 232. The user can select a class label different than the class label currently associated with the pixel that is in error and then, after selecting the fill software control 234 or the paint software control 238, select one or more pixels that are mis-labelled. As the ML model is typically very good at determining boundaries, it will likely assign pseudo-labels to all currently mis-labelled pixels of the object to correct all mis-labels of that object.

Figure 5:
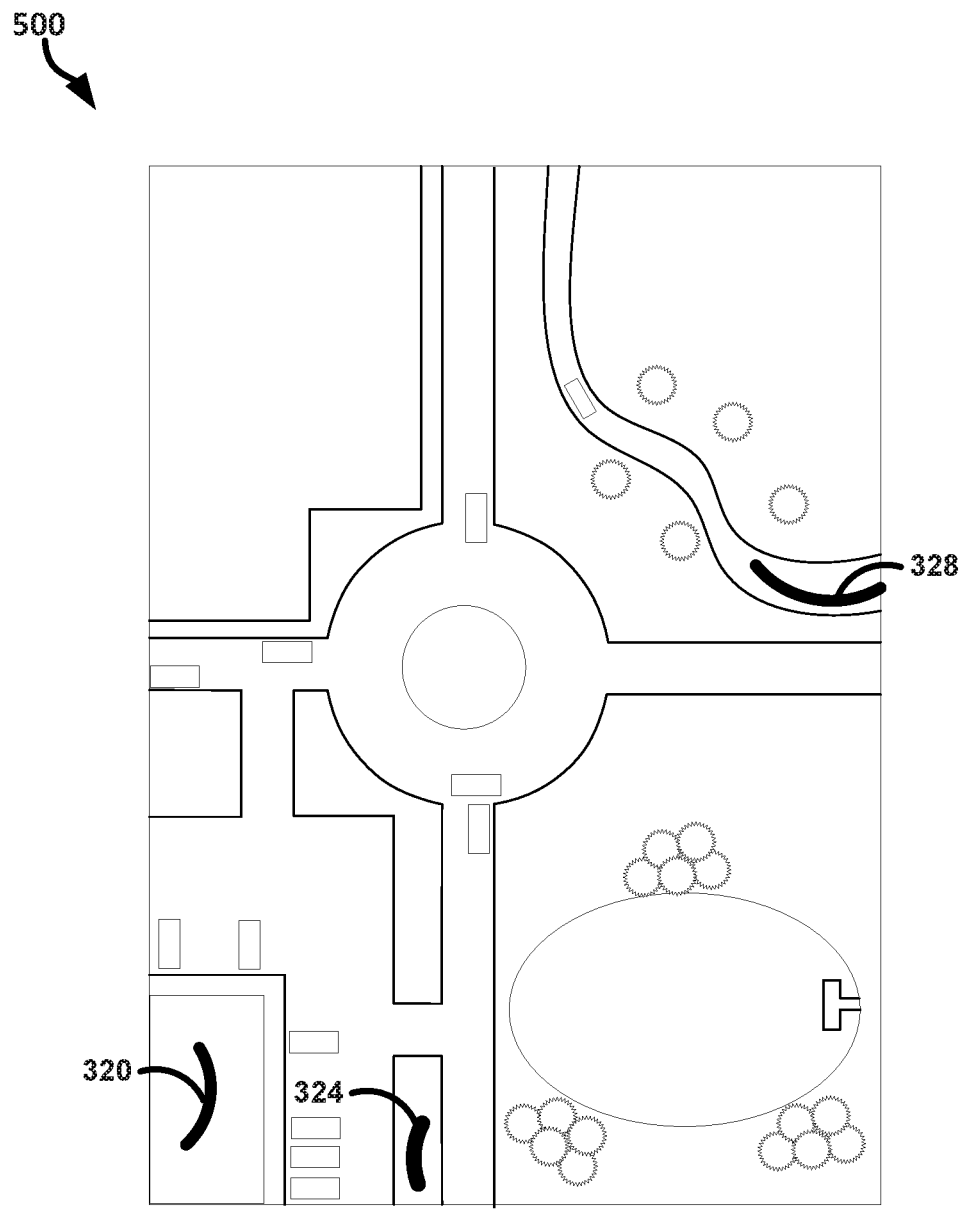
FIG. 5 illustrates, by way of example, a diagram of an embodiment of a UI.

FIG. 5 illustrates, by way of example, a diagram of an embodiment of a UI 500. The UI 500 includes the UI 400 after correction of a few of the mislabeled pixels. In the UI 500, the user has painted corrected class labels for a portion of a building, bare earth, and water. Note that the user has not corrected every mistake made by the ML model. The mislabeled bare earth near the center of the image is still mis-labelled as foliage (see the class label 322A of FIG. 4).

Figure 6:
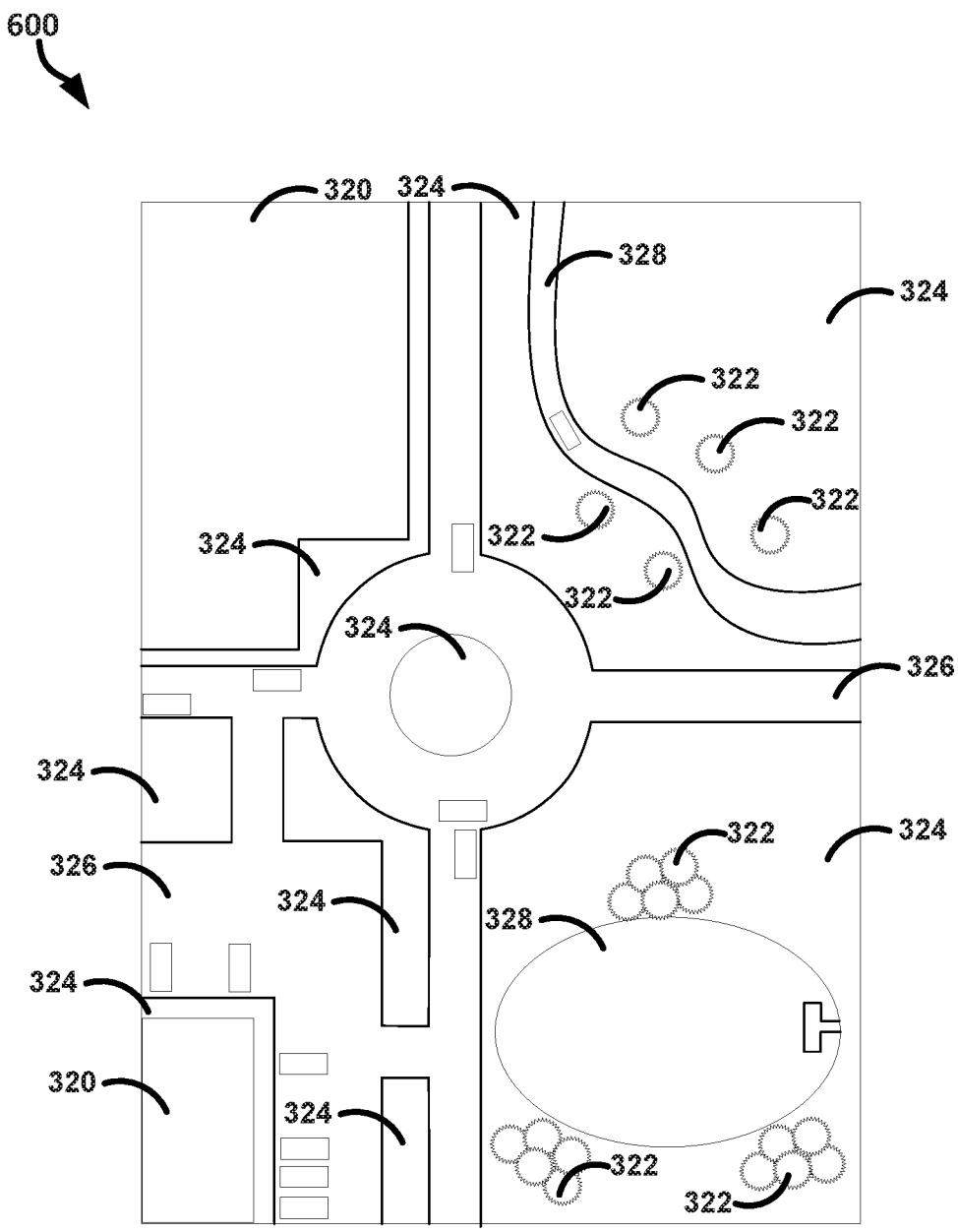
FIG. 6 illustrates, by way of example, a diagram of an embodiment of a UI.

FIG. 6 illustrates, by way of example, a diagram of an embodiment of a UI 600. The UI 600 includes the UI 500 after the user has selected the play software control 230. As previously discussed, the play software control 230 causes an ML trainer (e.g., implemented using processing circuitry) to perform an iteration of ML model training. In this iteration of the ML model training, the data for the training has been updated to be more accurate than a previous iteration. This allows the ML model to more accurately identify differences in features of the objects to be classified. Specifically, training on more accurate data allows the ML model to more accurately set its parameters (sometimes called weights) to better distinguish between classes (satisfy an objective function).

After the user has selected the play software control 230, the ML model has corrected the class label of the bare earth near the center of the rendered image. The updating of some of the mis-labelled pixels in the image (as in FIG. 5) has trained the model to better distinguish between classes (bare earth and foliage in this example). Through just a few human annotations and a few iterations of ML model training, the image is segmented with 100% accuracy.

Figure 7:
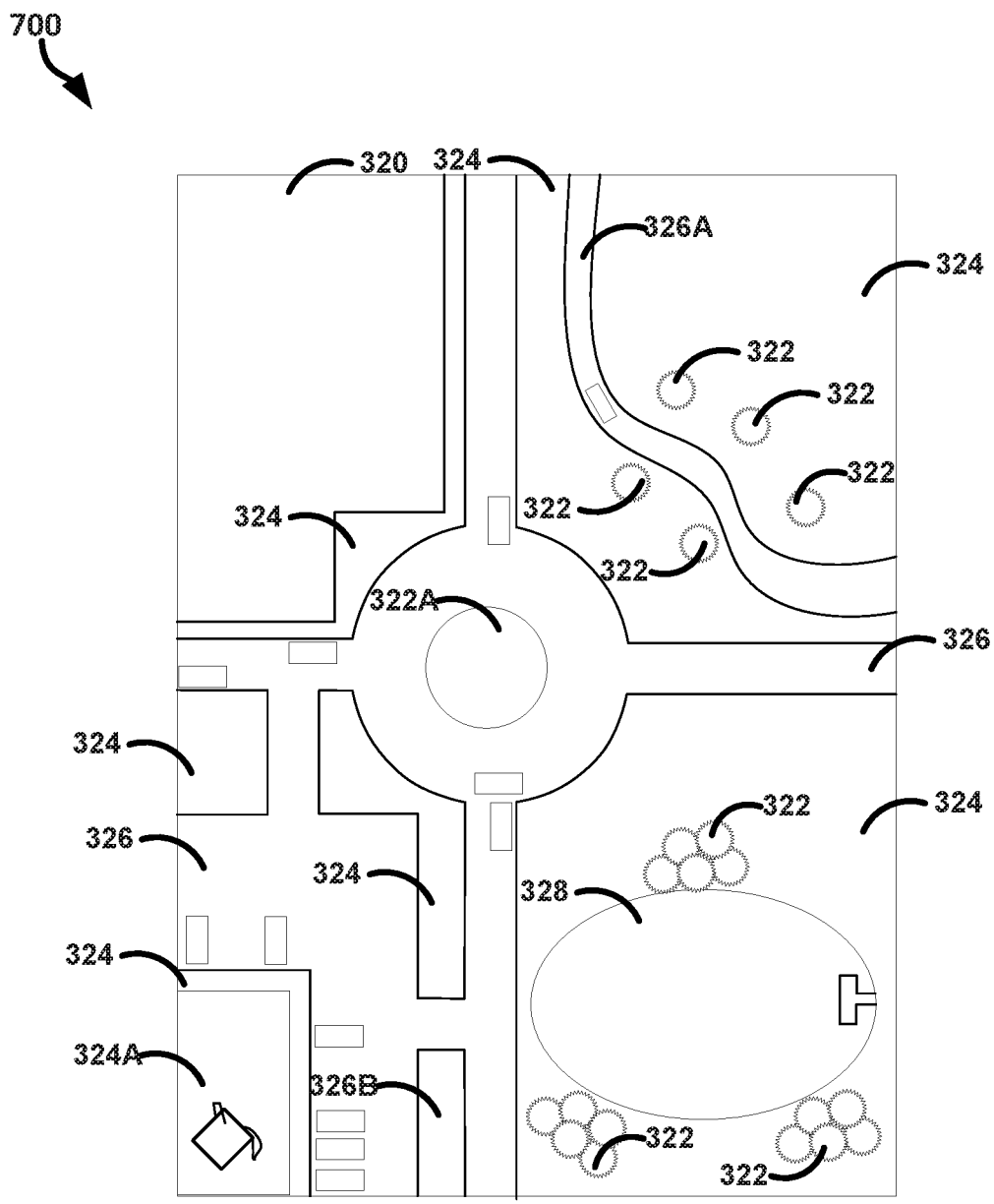
FIGS. 7 and 8 illustrate, by way of example, respective diagrams of how to update annotations of the image data using the fill software control.
Figure 8:
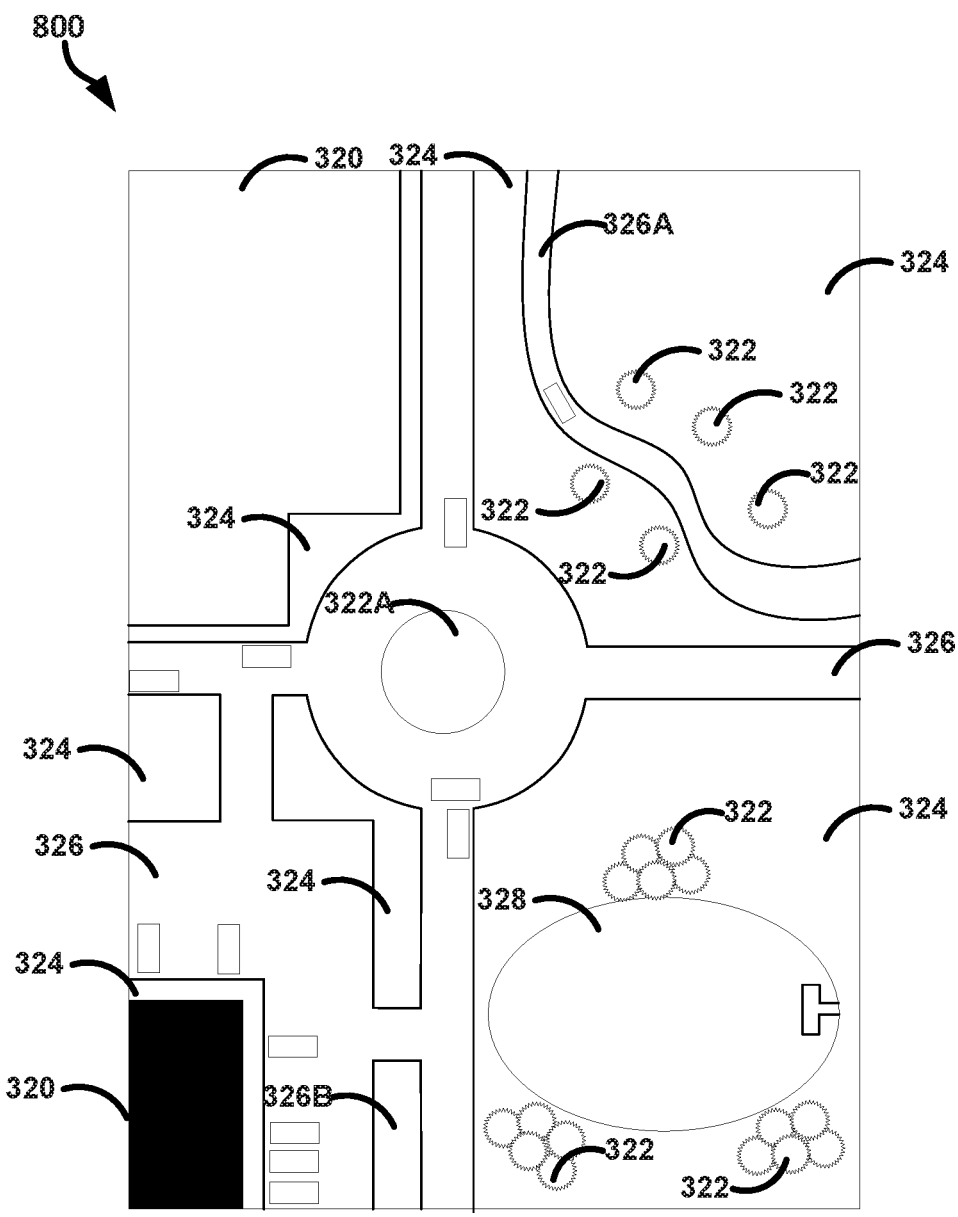
Figure 8:
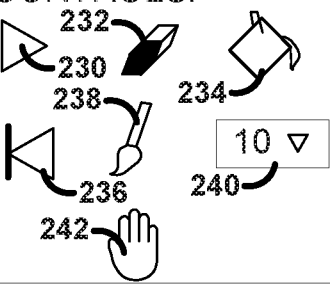

FIGS. 3-6 illustrate how to update annotations of the image data using the paintbrush software control 238. FIGS. 7 and 8 illustrate, by way of example, diagrams of how to update annotations of the image data using the fill software control 234. In FIG. 7, the user has selected the class label 320 and the fill software control 234 (not necessarily in that order) and moved a pointer 734 (an icon of the fill software control 234 in the example of FIG. 7) to the object mis-labelled with the class label 324A. FIG. 8 illustrates a UI 800 after the user selects a pixel mis-labelled with the class label 324A. All pixels contiguous with the pixel that is selected that includes a class label (whether human annotator provided or a pseudo-label) that is the same as the selected pixel are associated with the selected class label, in this example class label 320. The fill software control 234 expressly tells the ML model that all of the contiguous pixels are mis-labelled. The fill software control 234 can be particularly beneficial where the ML model has accurately identified an object boundary, but has mis-labelled the entire object.

Figure 9:
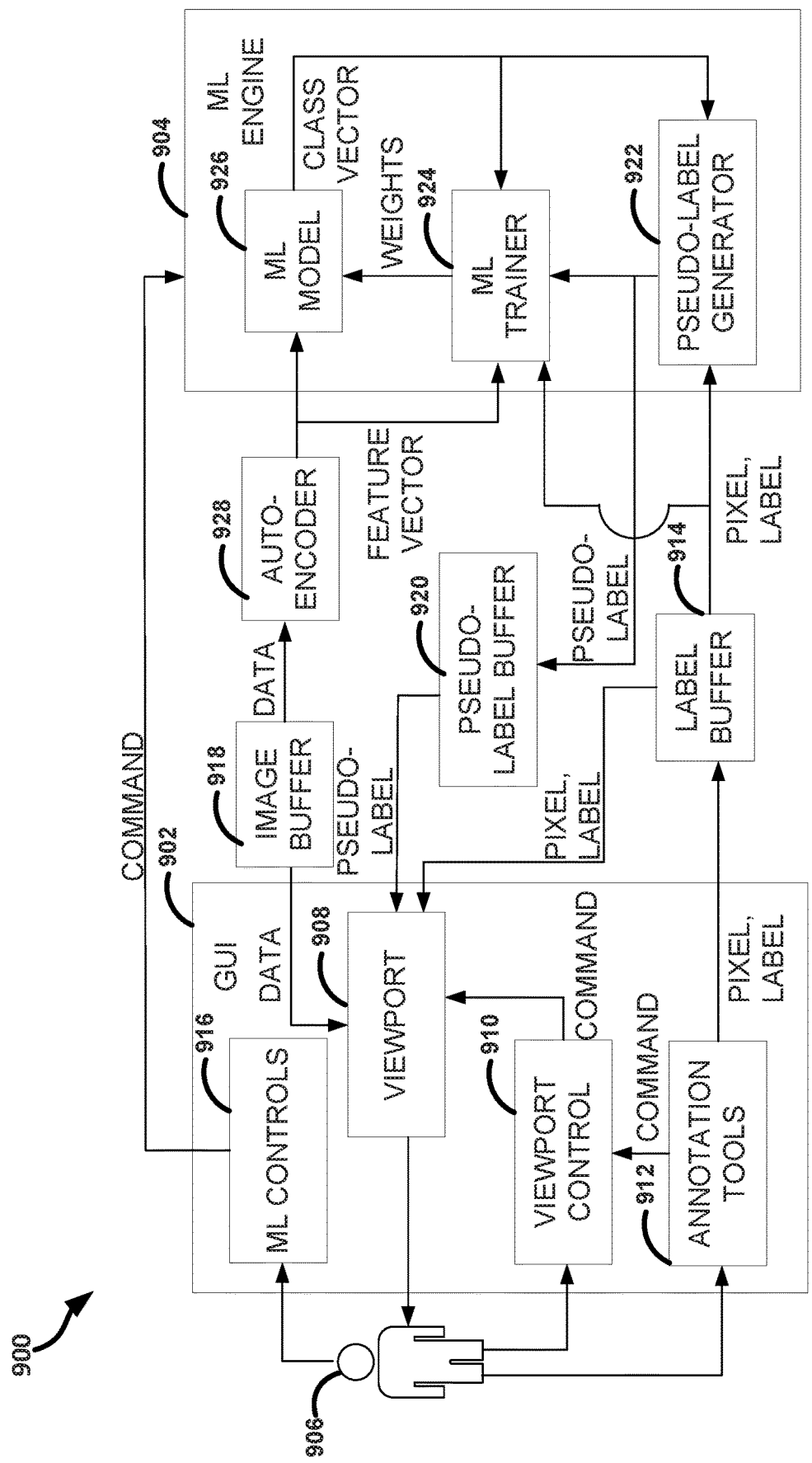
FIG. 9 illustrates, by way of example, a diagram of an embodiment of a system for image segmentation.

FIG. 9 illustrates, by way of example, a diagram of an embodiment of a system 900 for image segmentation. The system 900 as illustrated includes a UI 902 and an ML engine 904. The UI 902 provides an interface through which a user 906 can influence training (by an ML trainer 924) of an ML model 926. The UI 902 is provided by a display device (e.g., display device 1010 of computer system 1000, see FIG. 10).

The UI 902 is an embodiment of the UI 200, 300, 400, 500, 600, 700, 800.

The UI 902 as illustrated includes a viewport 908, a viewport control 910, annotation tools 912, a label buffer 914, ML controls 916, an image buffer 918, and a pseudo-label buffer 920.

The ML engine 904 as illustrated includes a pseudo-label generator 922, an ML trainer 924, and an ML model 926. The viewport 908 is a part of a view provided by a display device (e.g., the display device 1010 of FIG. 10). The viewport 908 is the portion of the view corresponding to image segmentation. The viewport 908 provides the visible portion of the image segmentation.

The viewport control 910 allows the user 906 to alter the view provided on the viewport 908. For example, the user 906 can select the hand software control 242 (see FIGS. 2-8) and then select and drag the rendered image to alter the portion of the image in view. In another example, the user 906 can alter a representation of an object of the rendered image using one or more of the annotation tools 912 (sometimes called software controls). The user can alter the representation of the object using one or more of the software controls 230, 232, 234, 236, 238.

The annotation tools 912 include software controls that affect the segmentation process. Such software controls include the software controls 230, 232, 234, 236, 238. The annotation tools 912, when used by the user 906, affect labels for pixels of the image data corresponding to the rendered image. Using the annotation tools 912 the user can alter a label associated with a pixel in the label buffer 914. The annotation tools 912 can remove a label associated with a pixel, change a class label to a different class label, or the like.

The label buffer 914 is a memory device that stores pixel indices and an associated class label for each of the pixels that has a class label specified by the user 906. The label buffer 914 can provide the pixel index and the class label to the ML trainer 924, pseudo-label generator 922, or the viewport 908. The annotation tools 912 can correct a class label previously indicated by the user 906 in error, can add a class label to a pixel for which the class label was not previously designated by the user 906.

The ML controls 916 include software controls that directly affect the training of the ML model 926. Directly affecting the training of the ML model 926 means an operation is to be performed by the ML trainer 924 in response thereto. Altering a label of a pixel is an indirectly affects the ML model 926. Examples of software controls that directly affect the ML model 926 include play software control 230 and the revert to the beginning software control 236. A command issued to the ML engine 904 using the ML controls 916 can include a train the ML model command or revert back to original command. The train ML model command can cause the ML trainer 924 to perform a next iteration of training the ML model 926. The revert to the beginning command (in response to selection of the revert to the beginning software control 236) causes the weights of the ML model to be re-initialized.

The image buffer 918 is a memory device that stores image data to be rendered on the viewport 908. The image buffer 918 includes pixel values for each pixel of the image to be rendered on the viewport 908. The pixel values can include red, green, blue values, grayscale values, or the like.

The pseudo-label buffer 920 includes pseudo-labels produced for each pixel of the image data or for each pixel of the image data for which the user has not provided a class label. The pseudo-label generator 922 can generate a pseudo-label that is used as a class assignment by the ML trainer 924. The pseudo-label generator 922 can receive a class vector from the ML model 926 and may also receive a class label. The pseudo-label generator 922 can, based on the class label and the class vector, determine a pseudo-label to be associated with the data of the image in a next training epoch.

Pseudo-labels are generally training labels that are chosen based on the output of a partially trained ML model 926. The pseudo-label generator 922, can use a class label corresponding to a highest value of all entries of the class vector (a class associated with a highest confidence score). In some embodiments, the pseudo-label is ignored if the user 906 has provided a class label for the pixel. In some embodiments, the pseudo-label is only used if the highest value in the class vector is greater than specified threshold (e.g., using the slider bar 440).

The ML model 926, often times an NN, receives a data vector and produces a class vector that contains confidence values for a specified set of classes that may be assigned to the data vector. The ML trainer 924 receives the class vector, the data (either raw or from an autoencoder 928, a label for each human-provided class label, and a pseudo-label for training in a subsequent epoch after an initial number of epochs (or an initial label, such as a random class label before a first epoch of training the ML model 926). The ML trainer 924 can operate in a semi-supervised or supervised manner, sometimes called deep learning. The label indicates a class to which the image data is a member. Often times the label is manually generated (e.g., by the user 906 or by crowd sourcing).

The ML trainer 924 can, based on the pseudo-label and label, generate more accurate model parameters (sometimes called weights) than an ML trainer that operates based on only the labels. The class vector can include a confidence for each class to be classified by the ML model 926. The class vector can indicate, for each class, an odds of the probability of the class divided by the probability of not the class. The class vector can be log-odds of the probability of the class divided by the probability of not the class. This is sometimes called logits. The logits are the inverse of the sigmoidal function or logistic transform.

The weights are associated with respective structures of the ML model 926. A weight is a configuration variable that is internal to the ML model 926. The weight is estimated from data provided to the ML trainer 924. The weight can be used by the ML model 926 in making a prediction.

The autoencoder 928 projects the image data to a segmentation space. The autoencoder 928 is optional. In embodiments that do not include the autoencoder 928, the ML model 926 can be trained on raw image data, such as from the image buffer 918.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 10:
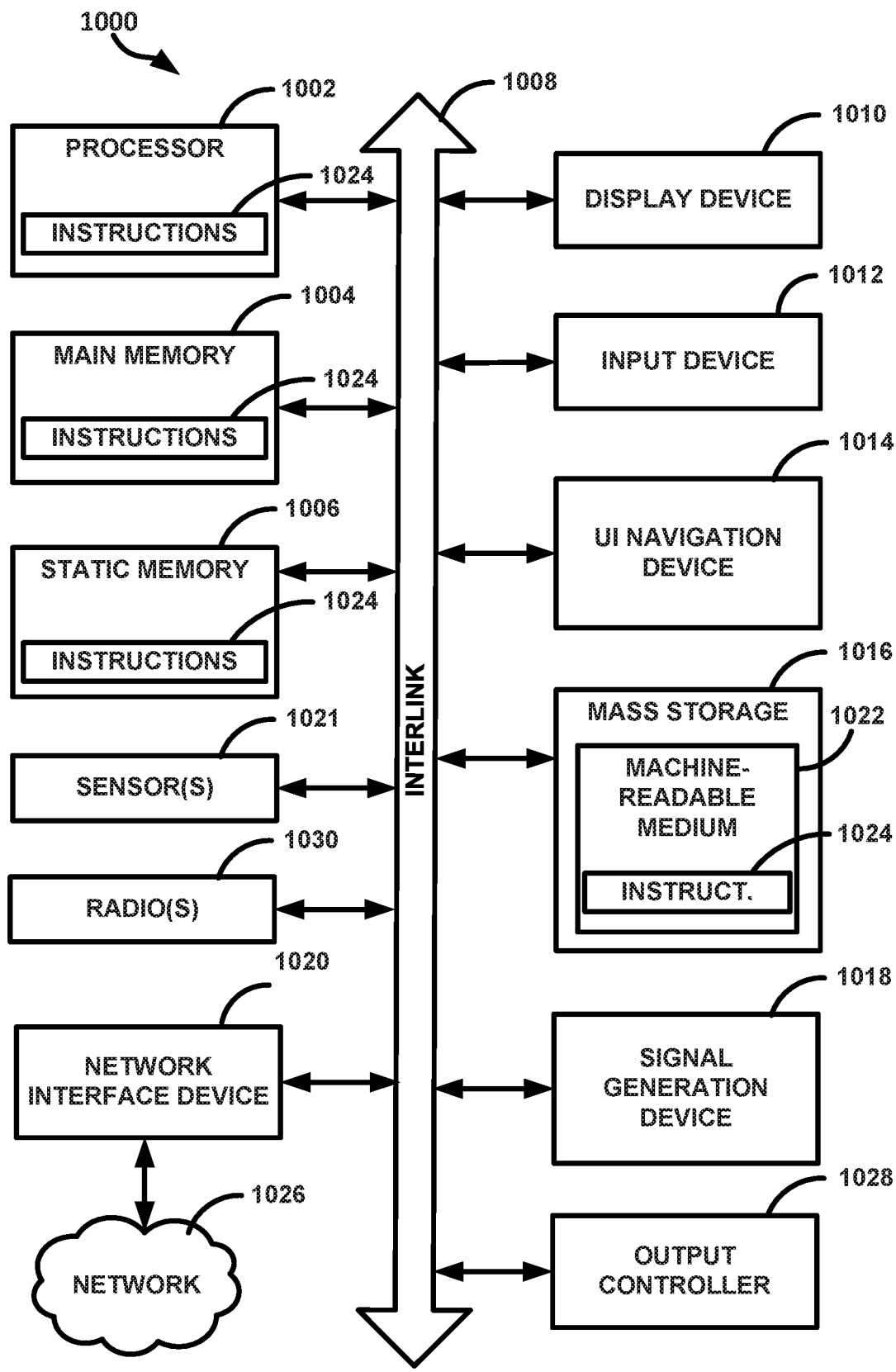
FIG. 10 illustrates, by way of example, a block diagram of an embodiment of a machine in the example form of a computer system within which instructions, for causing the machine to perform any one or more of the methodologies discussed herein, may be executed.

FIG. 10 illustrates, by way of example, a block diagram of an embodiment of a machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, or the like, or a combination thereof), a main memory 1004 and a static memory 1006, which communicate with each other via a bus 1008. The computer system 1000 may further include a display device 1010 (e.g., a liquid crystal display (LCD) or a cathode ray tube (CRT)). The computer system 1000 also includes an alphanumeric input device 1012 (e.g., a keyboard), a user interface (UI)

navigation device 1014 (e.g., a mouse), a disk drive unit 1016, a signal generation device 1018 (e.g., a speaker), a network interface device 1020, and radios 1030 such as Bluetooth, WWAN, WLAN, and NFC, permitting the application of security controls on such protocols.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Example Embodiments

Example 1 includes a method for annotating image data, the method comprising receiving, through a user interface (UI), for each class label of class labels to be identified by the ML model and for a proper subset of pixels of the image data, data indicating respective pixels associated with the class label, partially training a machine learning (ML) model based on the received data, generating, using the partially trained ML model, pseudo-labels for each pixel of the image data for which a class label has not been received, and receiving, through the UI, a further class label that corrects a pseudo-label of the generated pseudo-labels.

In Example 2, Example 1 further includes further training the ML model based on the class labels, further class label, and pseudo-labels for which neither a class label nor a further class label has been received.

In Example 3, Example 2 further includes executing the trained ML model on further image data to classify each pixel of the further image data or training another ML model using the image data and associated class labels, further class label, and pseudo-labels.

In Example 4, Example 3 further includes, wherein the respective class labels are provided by receiving, through the UI, data indicating a selected class label of the class labels, receiving, through the UI, data indicating a pixel of a rendered image of the image data to be associated with the selected class label, and associating, in a label buffer, the received selected class label with the pixel.

In Example 5, Example 4 further includes, wherein the pixel includes a currently associated class different than the received class label, and wherein associating, in a label buffer, the received class label with the pixel includes associating the received class label with every pixel contiguous with the pixel in the image data that has an associated class equal to the currently associated class.

In Example 6, at least one of Examples 1-5 further includes processing, prior to training the ML model based on the received data, the image data into a segmentation feature space, mathematical transform, or representation of the image data.

In Example 7, at least one of Examples 1-6 further includes associating, prior to training the ML model based on the received data to generate pseudo-labels, a class label to each pixel of the image data for which a class label was not received.

In Example 8, Example 7 further includes associating a pixel with the pseudo-label in response to determining that a generated pseudo-label for the pixel has an associated confidence score greater than a specified threshold.

In Example 9, Example 8 further includes, wherein the threshold is specified by a user through the UI.

In Example 10, at least one of Examples 1-9 further includes providing, by the UI, a view of the image data that includes a representation of the class label and pseudo-label overlaid on the pixel image, the class label and pseudo-label provided with an opacity specified by a user through the UI.

Example 11 includes a system for annotating image, the system comprising a memory including parameters of a machine learning (ML) model for pixel classification, a user interface (UI), processing circuitry to: receive, by the UI, for each class label of class labels to be identified by the ML model and for a proper subset of pixels of the image data, data indicating respective pixels associated with the class label, partially train the ML model based on the received data, generate, using the partially trained ML model, pseudo-labels for each pixel of the image data for which a class label has not been received, and receive, through the UI, a further class label that corrects a pseudo-label of the generated pseudo-labels.

In Example 12, Example 11 further includes, wherein the processing circuitry is further to train the ML model based on the class labels, further class label, and pseudo-labels for which neither a class label nor a further class label has been received.

In Example 13, Example 12 further includes executing the trained ML model on further image data to classify each pixel of the further image data or training another ML model using the image data and associated class labels, further class label, and pseudo-labels.

In Example 14, Example 13 further includes, wherein the respective class labels are provided by receiving, through the UI, data indicating a selected class label of the class labels, receiving, through the UI, data indicating a pixel of a rendered image of the image data to be associated with the selected class label, and associating, in a label buffer, the received selected class label with the pixel.

In Example 15, Example 14 further includes, wherein the pixel includes a currently associated class different than the received class label, and wherein associating, in a label buffer, the received class label with the pixel includes associating the received class label with every pixel contiguous with the pixel in the image data that has an associated class equal to the currently associated class.

Example 16 includes a non-transitory machine-readable medium including instructions that, when executed by a machine, cause the machine to perform operations for annotative image data, the operations comprising receiving, through a user interface (UI), for each class label of class labels to be identified by the ML model and for a proper subset of pixels of the image data, data indicating respective pixels associated with the class label, partially training a machine learning (ML) model based on the received data, generating, using the partially trained ML model, pseudo-labels for each pixel of the image data for which a class label has not been received, and receiving, through the UI, a further class label that corrects a pseudo-label of the generated pseudo-labels.

In Example 17, Example 16 further includes, wherein the operations further include further training the ML model based on the class labels, further class label, and pseudo-labels for which neither a class label nor a further class label has been received, and executing the trained ML model on further image data to classify each pixel of the further image data or training another ML model using the image data and associated class labels, further class label, and pseudo-labels.

In Example 18, Example 17 further includes, wherein the operations further comprise processing, prior to training the ML model based on the received data, the image data into a segmentation feature space, mathematical transform, or representation of the image data.

In Example 19, at least one of Examples 16-18 further includes associating, prior to training the ML model based on the received data to generate pseudo-labels, a class label to each pixel of the image data for which a class label was not received.

In Example 20, Example 19 further includes associating a pixel with the pseudo-label in response to determining that a generated pseudo-label for the pixel has an associated confidence score greater than a specified threshold, wherein the threshold is specified by a user through the UI.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method of annotating image data, the method comprising:
   receiving, through a user interface (UI), for each class label of at least three class labels to be identified by a machine learning (ML) model and for only a proper subset of pixels of the image data, data indicating respective pixels associated with the class label;
   partially training the ML model based on the received data to generate a partially trained ML model;
   generating, using the partially trained ML model, pseudo-labels for each pixel of the image data for which a class label has not been received;
   display, by the UI, each pixel with a color or shading that indicates the received class label and pseudo-label, a different color or shading indicating a different class label; and
   receiving, through the UI, a further class label that corrects a pseudo-label of the generated pseudo-labels and associating the further class label with the pixel.

2. The method of claim 1, further comprising further training the partially trained ML model based on the class labels, further class label, and pseudo-labels for which neither a class label nor a further class label has been received.

3. The method of claim 2 further comprising executing the further trained ML model on further image data to classify each pixel of the further image data or training another ML model using the image data and associated class labels, further class label, and pseudo-labels.

4. The method of claim 3, wherein the respective class labels are provided by:
   receiving, through the UI and from user operation of a first software control, data indicating a selected class label of the class labels;
   receiving, through the UI and from user operation of a second software control, data indicating a pixel of a rendered image of the image data to be associated with the selected class label; and
   associating, in a label buffer, the received selected class label with the pixel.

5. The method of claim 4, wherein the pixel includes a currently associated class different than the received class label, and wherein associating, in a label buffer, the received class label with the pixel includes associating the received class label with every pixel contiguous with the pixel in the image data that has an associated class equal to the currently associated class.

6. The method of claim 3, further comprising:
   processing, prior to partial training the ML model based on the received data, the image data into a segmentation feature space, mathematical transform, or representation of the image data.

7. The method of claim 3, further comprising:
   associating, prior to partially training the ML model based on the received data to generate pseudo-labels, a class label to each pixel of the image data for which a class label was not received.

8. The method of claim 7, further comprising associating a pixel with the pseudo-label in response to determining that a generated pseudo-label for the pixel has an associated confidence score greater than a specified threshold.

9. The method of claim 8, wherein the threshold is specified by a user, using a third software control, through the UI.

10. The method of claim 3, further comprising providing, by the UI, a view of the image data that includes a representation of the class label and pseudo-label overlaid on the pixel image, the class label and pseudo-label provided with an opacity specified by a user, using a fourth software control, through the UI.

11. A system for annotating image data, the system comprising:
- a memory including parameters of a machine learning (ML) model for pixel classification;
- a user interface (UI); and
- processing circuitry to:
  - receive, by the UI, for each class label of at least three class labels to be identified by the ML model and for a proper subset of pixels of the image data, data indicating respective pixels associated with the class label;
  - display, by the UI, each pixel with a color or shading that indicates the received class label;
  - partially train the ML model based on the received data to generate a partially trained ML model;
  - generate, using the partially trained ML model, pseudo-labels for each pixel of the image data for which a class label has not been received;
  - display, by the UI, each pixel with the color or shading that indicates the received class label and pseudo-label;
  - receive, through the UI, a further class label that corrects a pseudo-label of the generated pseudo-labels; and
  - display, by the UI each pixel with the color or shading that indicates the received class label, pseudo-label, and further class label.

12. The system of claim 11, wherein the processing circuitry is further to train the partially trained ML model based on the class labels, further class label, and pseudo-labels for which neither a class label nor a further class label has been received.

13. The system of claim 12, wherein the processing circuitry is further to execute the further trained ML model on further image data to classify each pixel of the further image data or training another ML model using the image data and associated class labels, further class label, and pseudo-labels.

14. The system of claim 13, wherein the respective class labels are provided by:
- receiving, through the UI and from user operation of a first software control, data indicating a selected class label of the class labels;
- receiving, through the UI and from user operation of a second software control, data indicating a pixel of a rendered image of the image data to be associated with the selected class label; and
- associating, in a label buffer, the received selected class label with the pixel.

15. The system of claim 14, wherein the pixel includes a currently associated class different than the received class label, and wherein associating, in a label buffer, the received class label with the pixel includes associating the received class label with every pixel contiguous with the pixel in the image data that has an associated class equal to the currently associated class.

16. A non-transitory machine-readable medium including instructions that, when executed by a machine, cause the machine to perform operations for annotative image data, the operations comprising:
- receiving, through a user interface (UI), for each class label of at least three class labels to be identified by a machine learning (ML) model and for only a proper subset of pixels of the image data, data indicating respective pixels associated with the class label;
- partially training the ML model based on the received data to generate a partially trained ML model;
- generating, using the partially trained ML model, pseudo-labels for each pixel of the image data for which a class label has not been received;
- display, by the UI, each pixel with a color or shading that indicates the received class label and pseudo-label, a different color or shading indicating a different class label; and
- receiving, through the UI, a further class label that corrects a pseudo-label of the generated pseudo-labels.

17. The non-transitory machine-readable medium of claim 16, wherein the operations further comprise:
- further training the partially trained ML model based on the class labels, further class label, and pseudo-labels for which neither a class label nor a further class label has been received; and
- executing the further trained ML model on further image data to classify each pixel of the further image data or training another ML model using the image data and associated class labels, further class label, and pseudo-labels.

18. The non-transitory machine-readable medium of claim 17, wherein the operations further comprise processing, prior to partially training the ML model based on the received data, the image data into a segmentation feature space, mathematical transform, or representation of the image data.

19. The non-transitory machine-readable medium of claim 17, wherein the operations further comprise associating, prior to partially training the ML model based on the received data to generate pseudo-labels, a class label to each pixel of the image data for which a class label was not received.

20. The non-transitory machine-readable medium of claim 19, wherein the operations further comprise associating a pixel with the pseudo-label in response to determining that a generated pseudo-label for the pixel has an associated confidence score greater than a specified threshold, wherein the threshold is specified by a user through the UI.

* * * * *